United States Patent Office 3,702,323
Patented Nov. 7, 1972

3,702,323
METHOD FOR PREPARING BENZODIAZEPINE DERIVATIVES
Hisao Yamamoto, Nishinomiya, Shigeho Inaba, Takarazuka, Tadashi Okamoto and Toshiyuki Hirohashi, Ashiya, Kikuo Ishizumi, Minoo, Michihiro Yamamoto, Toyonaka, Isamu Maruyama, Minoo, Kazuo Mori, Kobe, Tsuyoshi Kobayashi, Minoo, and Takahiro Izumi, Takarazuka, Japan, assignors to Sumitomo Chemical Company, Ltd., Osaka, Japan
No Drawing. Filed Apr. 7, 1970, Ser. No. 26,418
Claims priority, application Japan, Apr. 16, 1969, 44/29,904; May 29, 1969, 44/42,211
Int. Cl. C07d 53/06
U.S. Cl. 260—239.3 D
10 Claims

ABSTRACT OF THE DISCLOSURE

Novel and improved method for preparing benzodiazepine derivatives, which have prominent effects as tranquilizers, muscle relaxants, antispasmodics, anticonvulsants and hypnotics, represented by the formula,

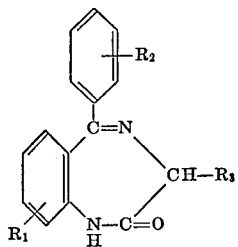

wherein $R_1$ is hydrogen, halogen, $C_{1-4}$ alkyl, nitro or trifluoromethyl; $R_2$ is hydrogen or halogen; and $R_3$ is hydrogen or $C_{1-4}$ alkyl. These benzodiazepine derivatives are prepared by reacting a novel 1-phthalimidoacyl-indole derivative represented by the formula,

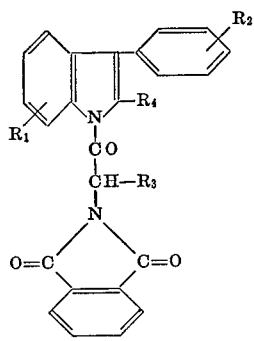

wherein $R_1$, $R_2$ and $R_3$ are as defined above; and $R_4$ is hydrogen or $C_{1-4}$ alkyl, with ozone and then contacting the reaction product with a hydrazine derivative. The 1-phthalimidoacyl-indole derivative is produced by phthalimidoacylation of an indole derivative represented by the formula,

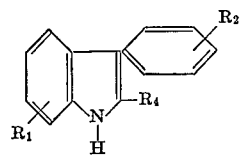

or Fischer cyclization of a phthalimidoacyl-phenylhydrazone derivative represented by the formula,

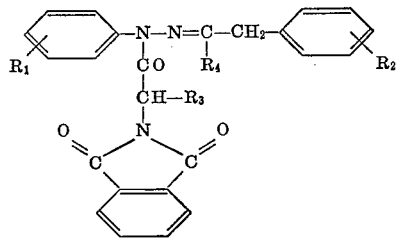

wherein $R_1$, $R_2$, $R_3$ and $R_4$ are as defined above.

---

This invention relates to a novel method for preparing benzodiazepine derivatives. More particularly, this invention pertains to a novel method for preparing benzodiazepine derivatives represented by the formula,

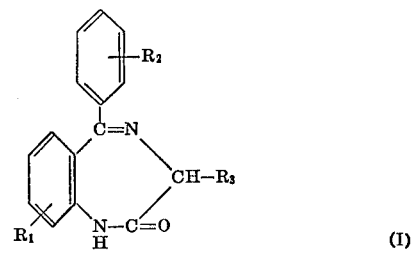

wherein $R_1$ represents a hydrogen atom, a halogen atom, a $C_{1-4}$ alkyl group, a nitro group or a trifluoromethyl group; $R_2$ represents a hydrogen atom or a halogen atom; and $R_3$ represents a hydrogen atom or a $C_{1-4}$ alkyl group.

In the compounds represented by the aforesaid Formula I, examples of the halogen atom include chlorine, bromine, iodine and fluorine atoms; and the $C_{1-4}$ alkyl group includes methyl, ethyl, n-propyl, isopropyl, n-butyl, isobutyl and tertiary butyl groups.

The benzodiazepine derivatives represented by the Formula I have prominent effects as tranquilizers, muscle relaxants, antispasmodics, anticonvulsants and hypnotics, and are of great importance as medicines.

A few processes for preparing these benzodiazepine derivatives have heretofore been described. For instance, it is known to obtain the benzodiazepine derivatives by treating an o-aminobenzophenone with a haloacetyl halide and then treating the resultant 2-haloacetamido compound with ammonia or by heating an o-aminobenzophenone with an excess of glycine ethyl ester hydrochloride in pyridine. (L. H. Sternbach et al., Journal of Organic Chemistry, 27, 3788 (1962); German patent publication 1,145,626; and German patent publication 1,136,-709).

Contrary to these procedures, the present inventors have found, unexpectedly, that benzodiazepine derivatives of the Formula I can be smoothly and economically prepared in high yields and of high purity by treating a 1-phthalimidoacyl-indole derivative with ozone and thereafter treating with a hydrazine derivative. Such process for converting a 5-membered ring compound into a 7-membered ring compound by ring expansion reaction, that is, a process for converting an N-acylated indole derivative into a benzodiazepine derivative has not heretofore been described or suggested in any literature. This new and useful process thus differs markedly from the known methods and represents an improvement thereover.

Accordingly an object of the present invention is to provide an improved and novel method for preparing benzodiazepine derivatives represented by the Formula I.

In the method of the present invention, benzodiazepine derivatives represented by the Formula I are prepared by treating a 1-phthalimidoacyl-indole derivative represented by the formula

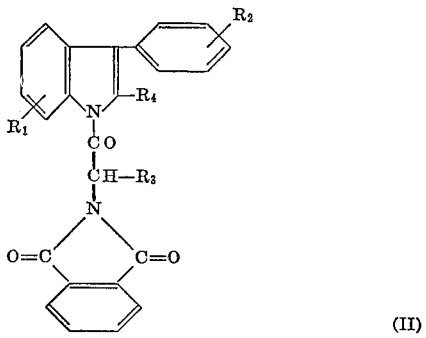

wherein $R_1$, $R_2$ and $R_3$ are as defined above, and $R_4$ represents hydrogen atom or a $C_{1-4}$ alkyl group; with ozone and then treating the reaction product with a hydrazine derivative.

The 1-phthalimidoacyl-indole derivatives of the Formula II are novel compounds. They may be prepared by treating indole derivatives represented by the formula,

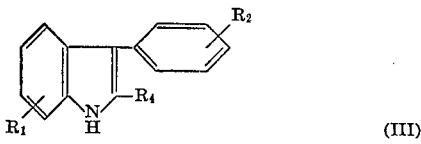

wherein $R_1$, $R_2$ and $R_4$ are as defined above, with a phthalimidoacyl halide represented by the formula,

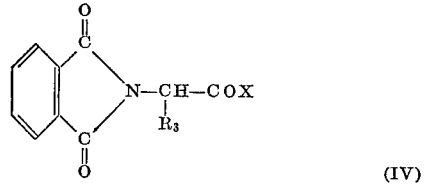

wherein $R_3$ is as defined above and X represents a halogen atom. Accordingly one of the processes of the present invention may be illustrated as follows:

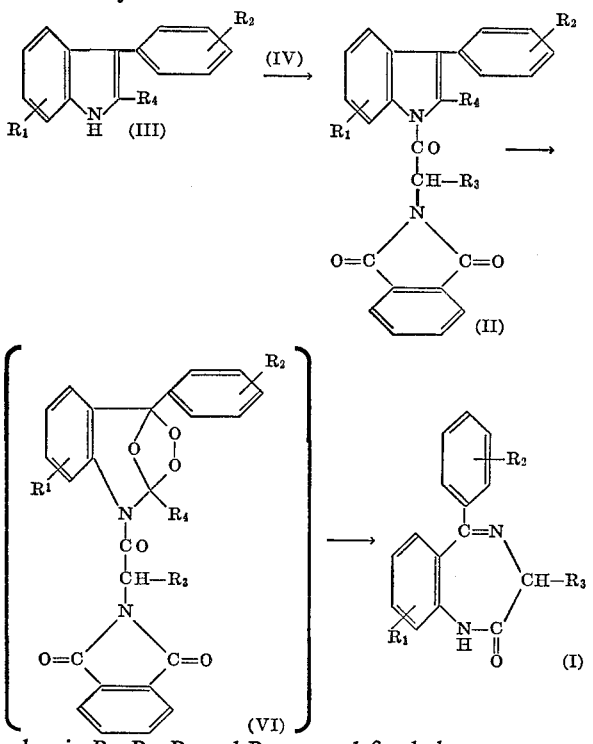

wherein $R_1$, $R_2$, $R_3$ and $R_4$ are as defined above.

In the process of this invention, the indole derivatives of the Formula III are acylated to the corresponding 1-phthalimidoacyl-indole derivatives of the Formula II. The acylation reaction is preferably conducted by contacting the indole derivative with an alkaline agent to form a metal salt and then intimately contacting the said salt with a phthalimidoacyl halide of the Formula IV. Suitable alkaline agents include sodium hydride, sodium amide, potassium amide and the like. The reaction is preferably carried out in an organic solvent or solvent mixture. Suitable solvents include dimethylformamide, benzene, toluene, xylene and the like, and a mixture thereof. The reaction is effected at room temperature, at a temperature below room temperature or at an elevated temperature.

The indole derivatives of the Formula III as starting materials of this invention may be prepared, for example, by Fischer cyclization of phenylhydrazone derivatives represented by the formula,

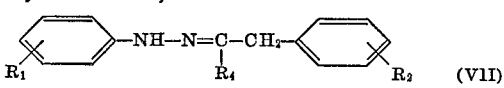

wherein $R_1$, $R_2$ and $R_4$ are as defined above, which may be prepared by contacting a phenylhydrazine derivative represented by the formula,

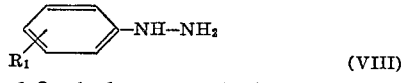

wherein $R_1$ is as defined above or salt thereof, with a compound represented by the formula,

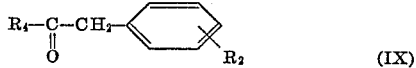

wherein $R_2$ and $R_4$ are as defined above. The indole derivatives of the Formula III may also be prepared directly by treating a phenylhydrazine derivative of the Formula VIII with a compound of the Formula IX without isolation of phenylhydrazone derivatives of the Formula VII.

Alternatively, the 1-phthalimidoacyl-indole derivatives of the Formula III may also be obtained by acylating a phenylhydrazone derivative of the Formula VII with a phthalimidoacyl halide of the Formula IV to the corresponding phthalimidoacyl-phenylhydrazone derivative represented by the formula,

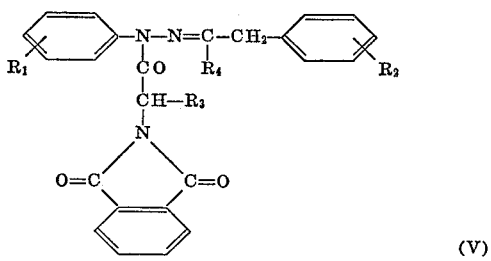

wherein $R_1$, $R_2$, $R_3$ and $R_4$ are as defined above, and then treating the said 1-phthalimidoacyl-hydrazone derivative at elevated temperature.

The acylation of the phenylhydrazone derivative of the Formula VII with the phthalimidoacyl halide of the Formula IV is carried out in the presence of an acid-binding agent, that is, an agent capable of tying up or neutralizing the hydrogen halide split off by the reaction, the amount of acid-binding agent required in the reaction mixture being at least one molar equivalent of the amount of the reactants.

Examples of suitable acid-binding agents are inorganic bases such as alkali metal hydroxide, alkali metal carbonates and the like, or tertiary organic bases such as pyridine, triethylamine, tributylamine, N-methylpiperidine, dimethylaniline or the like. The reaction is preferably carried out in the presence of a solvent or solvent mixture. Suitable solvents include benzene, toluene, ether, tetrahydrofuran, pyridine, dioxane and the like and mixture thereof. These organic solvents may also be present in the form of mixtures with water, when an inorganic base is used as the acid-binding agent. The reaction may usually be, conducted at a temperature between about −20° C. and room temperature, although an elevated temperature may be employed.

The thus-obtained phthalimidoacyl-phenylhydrazone derivatives of the Formula V may be converted to the 1-phthalimidoacyl-indole of the Formula II by Fischer cyclization. The reaction may be carried out preferably in the presence of a catalytic or much amount of an acid. Examples of suitable acid include a mineral acid such as hydrochloric acid, hydrobromic acid, sulfuric acid, phosphoric acid and polyphosphoric acid; an organic acid such as acetic and formic acid; and other Lewis acids such as zinc chloride, aluminum chloride, stannic chloride and boron trifluoride, and a mixture thereof. The reaction is carried out in the absence or presence of a solvent. Suitable solvents include a lower alkanol such as methanol, ethanol, isopropanol or tertiary butanol; an aromatic hydrocarbon such as benzene, toluene or xylene; an organic acid such as formic acid and acetic acid; and other organic solvents such as chloroform or cyclohexane. The reaction is carried out by heating the reaction mixture at elevated temperature, preferably at a temperature between 50° C. and 250° C.

Conversion of the 1-phthalimidoacyl-indole derivatives of the Formula II to the desired benzodiazepine derivatives of Formula I is effected via the ozonide intermediates represented by the formula,

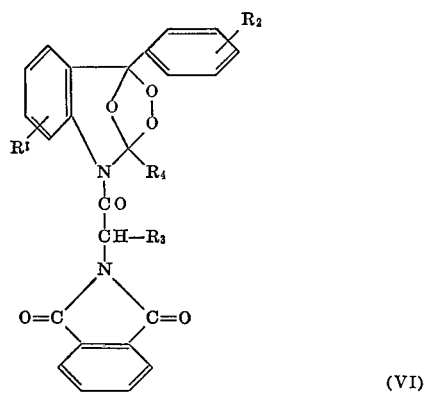

(VI)

wherein $R_1$, $R_2$, $R_3$ and $R_4$ are as defined above.

Ozonolysis of 1-phthalimidoacyl-indole derivatives are carried out by using ozone, ozone-oxygen, ozone-nitrogen, ozone-air or the like.

The 1-phthalimidoacyl-indole derivatives of the Formula I or acid-addition salts thereof are dissolved or suspended in an organic solvent and contacted with ozone, until about 1 molar equivalent of ozone is absorbed. Suitable solvents include acetic acid, formic acid, methanol, carbon tetrachloride, methylene chloride, chloroform, ethyl acetate or the like. The reaction is carried out at a room temperature, at a temperature below room temperature or at an elevated temperature. It is not necessary to isolate the ozonide intermediate from the reaction mixture for reacting with a hydrazine derivative in the next step.

The reaction of the ozonide intermediate with a hydrazine derivative such as hydrazine hydrate or phenylhydrazine gives the desired benzodiazepine derivatives. The hydrazine derivative is used in at least equimolar amount of the 1-phthalimidoacyl-indole derivative or the ozonide. The reaction is generally carried out in the presence of a solvent or solvent mixture. Suitable solvents are, for example, methanol, ethanol, isopropanol, chloroform, dimethyl sulfoxide, water, and mixture thereof. The reaction is carried out at a temperature within the range between about room temperature and the boiling point of the solvent employed.

The benzodiazepine derivatives obtained according to the above-mentioned method may also be isolated in the form of an acid addition salt by treatment with an acid, e.g. a mineral acid such as hydrochloric acid, hydrobromic acid, sulfuric acid, nitric acid, phosphoric acid, or an organic acid such as maleic acid, fumaric acid, succinic acid or acetic acid and the like.

According to the method of the present invention, there may be prepared such benzodiazepine derivatives as shown below:

5-phenyl-1,3-dihydro-2H-1,4-benzodiazepin-2-one 5-phenyl-7-chloro-1,3-dihydro-2H-1,4-benzodiazepin-2-one 5-phenyl-7-bromo-1,3-dihydro-2H-1,4-benzodiazepin-2-one 5-phenyl-7-nitro-1,3-dihydro-2H-1,4-benzodiazepin-2-one 5-phenyl-7-trifluoromethyl-1,3-dihydro-2H-1,4-benzodiazepin-2-one 5-phenyl-7-methyl-1,3-dihydro-2H-1,4-benzodiazepin-2-one 3-methyl-5-phenyl-7-chloro-1,3-dihydro-2H-1,4-benzodiazepin-2-one 5-(o-chlorophenyl)-7-chloro-1,3-dihydro-2H-1,4-benzodiazepin-2-one 5-(o-chlorophenyl)-7-nitro-1,3-dihydro-2H-1,4-benzodiazepin-2-one 5-(o-fluorophenyl)-7-chloro-1,3-dihydro-2H-1,4-benzodiazepin-2-one 5-(o-fluorophenyl)-7-nitro-1,3-dihydro-2H-1,4-benzodiazepin-2-one 5-(p-chlorophenyl)-7-chloro-1,3-dihydro-2H-1,4-benzodiazepin-2-one This invention is further disclosed in the following examples of preferred embodiments thereof, which are presented for purposes of illustration and are not intended to limit the scope of the invention.

EXAMPLE 1

A mixture of 20 g. of phthaloyl glycine and 35.2 g. of thionyl chloride is heated under reflux for one hour. The excess of thionyl chloride is removed under reduced pressure. To the residue is added dry toluene and the solvent is removed under reduced pressure to give 22.4 g. of phthalimidoacetyl chloride as an oil.

The thus obtained phthalimidoacetyl chloride is dissolved in 80 ml. of dry tetrahydrofuran and the solution is added dropwise to a solution of 20 g. of phenylacetaldehyde-p-chlorophenylhydrazone in 160 ml. of dry tetrahydrofuran and 7.7 g. of pyridine below 0° C. The mixture is stirred below 0° C. for 5 hours and allowed to stand overnight at 0° C. The reaction mixture is filtered and washed with ether. The filtrate and washings are combined and the solvent is removed under reduced pressure to give 47.4 g. of phenylacetaldehyde-$N^1$-phthalimidoacetyl-$N^1$ - (p-chlorophenyl)hydrazone as a syrup, which solidifies slowly. Recrystallization from ethanol gives phenylacetaldehyde-$N^1$-phthalimidoacetyl-$N^1$-(p-chlorophenyl)hydrazone as plates, M.P. 169.5°–171.5° C.

The phenylacetaldehyde-p-chlorophenylhydrazone used as starting material in this example is obtained as follows:

To a suspension of 28.8 g. of p-chlorophenylhydrazine in 150 ml. of ethanol is added 30 ml. of acetic acid. To the mixture is added dropwise 27.5 g. of phenylacetaldehyde at 10°–15° C. The mixture is stirred at 10°–15° C. for 1 hour and then 72°–78° C. for 15 minutes. The solvent is removed under reduced pressure. The residue is treated with 500 ml. of ether, 50 ml. of 28% ammonia water and then 100 ml. of water. The etheral layer is washed with water and then saturated with sodium chloride solution, and dried over sodium sulfate, and the solvent is removed. The oily residue is crystallized from n-hexane to give 45.7 g. of phenylacetaldehyde-p-chlorophenylhydrazone, M.P. 66°–79° C.

According to the above procedure, the following compounds are similarly prepared:

Phenylacetaldehyde-N$^1$-phthalimidoacetyl-N$^1$-(p-bromophenyl)hydrazone,
Phenylacetaldehyde-N$^1$-phthalimidoacetyl-N$^1$-phenylhydrazone,
Phenylacetaldehyde-N$^1$-phthalimidoacetyl-N$^1$-(p-nitrophenyl)hydrazone,
Phenylacetaldehyde-N$^1$-phthalimidoacetyl-N$^1$-(p-trifluoromethylphenyl)hydrazone,
(o-Chlorophenyl)acetaldehyde-N$^1$-phthalimidoacetyl-N$^1$-(p-chlorophenyl)hydrazone,
(o-Chlorophenyl)acetaldehyde-N$^1$-phthalimidoacetyl-N$^1$-(p-nitrophenyl)hydrazone,
(o-Fluorophenyl)acetaldehyde-N$^1$-phthalimidoacetyl-N$^1$-(p-chlorophenyl)hydrazone,
(p-Chlorophenyl)acetaldehyde-N$^1$-phthalimidoacetyl-N$^1$-(p-chlorophenyl)hydrazone.

EXAMPLE 2

A mixture of 0.5 g. of phenylacetaldehyde-N$^1$-(phthalimidoacetyl)-N$^1$-(p-chlorophenyl)hydrazone and 0.5 of zinc chloride is heated to 215° C. with stirring. After cooling, 20 ml. of water is added. The mixture is heated under reflux. The water-insoluble materials are collected by filtration, washed with water and dried to give 0.45 g. of 1-(phthalimidoacetyl) - 3 - phenyl - 5 - chloroindole (yield: 93.5%). Recrystallization from ethanol gives pale yellow prisms, M.P. 232°–234° C.

EXAMPLE 3

A mixture of 15 g. of phenylacetaldehyde-N$^1$-(phthalimidoacetyl) - N$^1$ - (p - chlorophenyl)hydrazone and 75 g. of polyphosphoric acid is heated to 180° C. for 10 minutes with stirring. The reaction mixture is cooled and poured into water. The resulting crystals are collected by filtration, washed with water and dried to give 13.7 g. of 1 - (phthalimidoacetyl) - 3 - phenyl - 5-chloroindole. (Yield: 95%). Recrystallization from ethanol gives pale yellow prisms, M.P. 232°–234° C.

Similarly, the following compounds are obtained:

1-phthalimidoacetyl-3-phenylindole,
1-phthalimidoacetyl-3-phenyl-5-bromoindole,
1-phthalimidoacetyl-3-phenyl-5-nitroindole,
1-phthalimidoacetyl-3-phenyl-5-trifluoromethylindole,
1-phthalimidoacetyl-3-(o-chlorophenyl)-5-chloroindole,
1-phthalimidoacetyl-3-(o-chlorophenyl)-5-nitroindole,
1-phthalimidoacetyl-3-(o-fluorophenyl)-5-chloroindole,
1-phthalimidoacetyl-3-(p-chlorophenyl)-5-chloroindole.

EXAMPLE 4

To a cooled solution of 15 g. of 2-methyl-3-phenyl-5-chloroindole in dimethylformamide is added 3.24 g. of 63% sodium hydride oil dispersion under cooling, and the mixture is stirred below −5° C. for 2 hours. To the mixture is added dropwise a solution of 22.4 g. of phthalimidoacetyl chloride in 100 ml. of toluene at −5° to 3° C. The mixture is stirred at −1° C. for 2 hours. The reaction mixture is allowed to stand overnight in a refrigerator. The precipitate is collected by filtration, washed with ether and dried to give 1-(phthalimidoacetyl) - 2 - methyl - 3 - phenyl - 5 - chloroindole. Recrystallization from dimethylformamide gives pale yellow needles, M.P. 254°–255° C. The filtrate is poured into water and the precipitated solid is collected by filtration, washed with ether and dried to give additional 1-(phthalimidoacetyl)-2-methyl-3-phenyl-5-chloroindole.

The 2-methyl-3-phenyl-5-chloroindole used as a starting material in this example is obtained as follows:

A mixture of 25 g. of p-chlorophenylhydrazine hydrochloride and 50 g. of phenylacetone is stirred at 80° C. for 2 hours. The mixture is filtered and the filtrate is distilled under reduced pressure to give 2-methyl-3-phenyl-5-chloroindole, B.P. 170°–175° C. (0.5–0.6 mm. Hg), M.P. 78°–83° C. Recrystallization from aqueous ethanol gives crystals, M.P. 84°–86° C.

Similarly, the following compounds are obtained:

1-(phthalimidoacetyl)-2-methyl-3-phenylindole,
1-(phthalimidoacetyl)-2-methyl-3-phenyl-5-bromoindole,
1-(phthalimidoacetyl)-2-methyl-3-phenyl-5-nitroindole,
1-(phthalimidoacetyl)-2-methyl-3-(o-chlorophenyl)-5-chloroindole,
1-(phthalimidoacetyl)-3-(o-chlorophenyl)-5-nitroindole,
1-(phthalimidoacetyl)-2-methyl-3-(o-fluorophenyl)-5-chloroindole,
1-(phthalimidoacetyl)-3-(p-chlorophenyl)-5-chloroindole,
1-(phthalimidoacetyl)-3-phenyl-5-chloroindole,
1-(phthalimidoacetyl)-3-phenyl-5-nitroindole,
1-(phthalimidoacetyl)-3-phenyl-5-methoxyindole,
1-(α-phthalimidopropionyl)-3-phenyl-5-chloroindole.

EXAMPLE 5

A suspension of 1.0 g. of 1-phthalimidoacetyl)-3-phenyl-5-chloroindole in 20 ml. of acetic acid is ozonized with ozone-oxygen at 20° C. for 4 hours. A precipitate is collected by filtration, washed with acetic acid and dried under reduced pressure to give 0.6 g. of the ozonide, M.P. 168°–170° C. (decomposition). The second crop (0.3 g.) is obtained from the filtrate by adding water.

The thus obtained ozonide (0.9 g.) is suspended in a mixture of 10 ml. of chloroform and 10 ml. of ethanol. To the suspension are added 0.35 g. of hydrazine hydrate and 3.5 ml. of water, and the mixture is stirred at room temperature for 2 hours into a solution. The mixture is allowed to stand overnight. The solvent is removed under reduced pressure. The residue is partitioned into ether and water layers. The aqueous layer is extracted with ether. The etheral layers are combined and extracted with 5% hydrochloric acid. The hydrochloric acid extract containing the reaction product is basified with 10% aqueous sodium hydroxide solution and then extracted with ether. The etheral extract is washed with a saturated sodium chloride solution, and the solvent is removed under reduced pressure to give 5-phenyl-7-chloro-1,3-dihydro - 2H - 1,4 - benzodiazepin - 2 - one, M.P. 202°–205° C. (decomposition).

EXAMPLE 6

Using the procedure similar to that of Example 5 but replacing 1 - (phthalimidoacetyl) - 3 - phenyl - 5 - chloroindole by 1 - (phthalimidoacetyl) - 3 - (o - fluorophenyl)-5 - chloroindole, there is obtained 5 - (o - fluorophenyl)-7 - chloro - 1,3 - dihydro - 2H - 1,4 - benzodiazepin - 2-one, which is recrystallized from ethanol to give crystals, M.P. 204°–206° C.

EXAMPLE 7

Similarly, using the procedure similar to that of Example 5 but replacing 1-(phthalimidoacetyl)-3-phenyl-5-chloroindole by 1 - (phthalimidoacetyl) - 3 - phenyl - 5-bromoindole, there is obtained 5 - phenyl - 7 - bromo-1,3 - dihydro - 2H - 1,4 - benzodiazepin - 2 - one, which is recrystallized from acetone gives crystals, M.P. 220°–221° C.

Similarly, the following compounds are obtained:

5-phenyl-1,3-dihydro-2H-1,4-benzodiazepin-2-one,
5-phenyl-7-nitro-1,3-dihydro-2H-1,4-benzodiazepin-2-one,
5-(o-chlorophenyl)-7-chloro-1,3-dihydro-2H-1,4-benzodiazepin-2-one,
5-(o-chlorophenyl)-7-chloro-1,3-dihydro-2H-1,4-benzodiazepin-2-one,
5-(o-chlorophenyl)-7-nitro-1,3-dihydro-2H-1,4-benzodiazepin-2-one.

EXAMPLE 8

A suspension of 1.0 g. of 1-(phthalimidoacetyl)-2-methyl-3-phenyl-5-chloroindole in 20 ml. of acetic acid is ozonized with ozone-oxygen at room temperature for 2 hours with stirring. The mixture is stirred for 2 hours and filtered. The filtrate is poured into water and the resulting crystals are collected by filtration, washed with water and dried under reduced pressure to give 0.98 g. of the ozonide, M.P. 98°–109° C. (decomposition).

The thus obtained ozonide is dissolved in a mixture of 1.1 ml. of chloroform and 1.1 ml. of ethanol. To the solution are added 0.03 g. of hydrazine hydrate and 0.03 ml. of water. The mixture is allowed to stand at room temperature. The solvent is removed under reduced pressure. To the residue are added 10 ml. of water, 10 ml. of ether and 0.2 ml. of 28% ammonia water and the obtained mixture is shaken. The aqueous layer is extracted with ether. The etheral layers are combined, extracted with 5% hydrochloric acid. The hydrochloric acid extracts are combined, basified with ammonia water, extracted with ether and dried over sodium sulfate, and the solvent is removed to give 5-phenyl-7-chloro-1,3-dihydro-2H-1,4-benzodiazepin-2-one.

What is claimed is:

1. A method for preparing benzodiazepine derivatives represented by the formula,

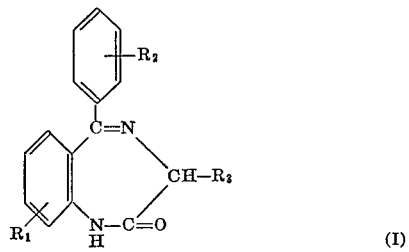

wherein $R_1$ represents a hydrogen atom, a halogen atom, a $C_{1-4}$ alkyl group, a nitro group or a trifluoromethyl group; $R_2$ represents a hydrogen atom or a halogen atom; and $R_3$ represents a hydrogen atom or a $C_{1-4}$ alkyl group, which comprises contacting a 1-phthalimidoacyl-indole derivative represented by the formula,

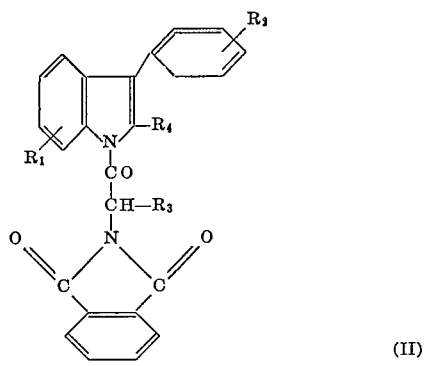

wherein $R_1$, $R_2$ and $R_3$ are as defined above, and $R_4$ represents hydrogen atom or a $C_{1-4}$ alkyl group; with ozone, and thereafter contacting the obtained reaction product with a hydrazine derivative.

2. A method according to claim 1, wherein the 1-phthalimidoacyl-indole derivative represented by the Formula II is contacted with an equimolar amount of ozone in the presence of a solvent and then contacting the obtained reaction product with at least equimolar amount of the 1-phthalimidoacyl-indole derivative of hydrazine hydrate or phenylhydrazine in the presence of a solvent.

3. A method for preparing benzodiazepine derivatives represented by the formula

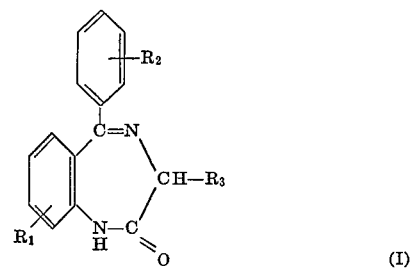

wherein $R_1$ represents a hydrogen atom, a halogen atom, a $C_{1-4}$ alkyl group, a nitro group or trifluoromethyl group; $R_2$ represents a hydrogen atom or a halogen atom; and $R_3$ represents a hydrogen atom or a $C_{1-4}$ alkyl group, which comprises contacting an indole derivative represented by the formula,

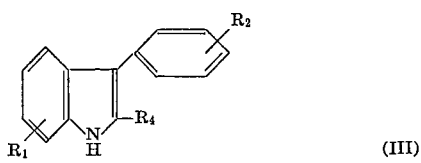

wherein $R_1$ and $R_2$ are as defined above, and $R_4$ represents a hydrogen atom or a $C_{1-4}$ alkyl group, with a phthalimidoacyl halide represented by the formula,

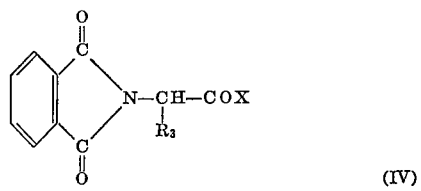

wherein $R_3$ is as defined above, and X represents a halogen atom, to obtain a 1-phthalimidoacyl-indole derivative represented by the formula,

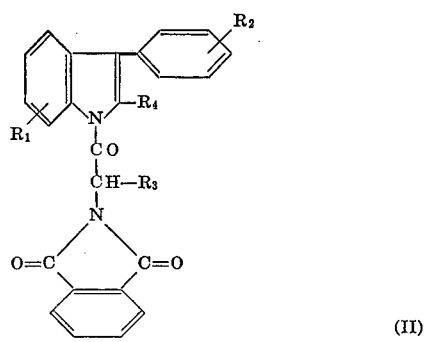

wherein $R_1$, $R_2$, $R_3$ and $R_4$ are as defined above, contacting the obtained 1-phthalimidoacyl-indole derivative represented by the Formula II with ozone, and thereafter with a hydrazine derivative.

4. A method according to claim 3, wherein the indole derivative represented by the Formula III is contacted with an alkaline agent in a solvent to form a metal salt of the indole derivative and the metal salt is contacted with the phthalimidoacyl halide represented by the Formula IV to obtain the 1-phthalimidoacyl-indole derivative represented by the Formula II.

5. A method for preparing benzodiazepine derivatives represented by the formula,

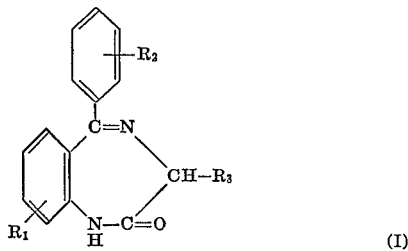

(I)

wherein $R_1$ represents a hydrogen atom, a halogen atom, atom, a $C_{1-4}$ alkyl group, a nitro group or a trifluoromethyl group; $R_2$ represents a hydrogen atom or a halogen atom; and $R_3$ represents hydrogen atom or a $C_{1-4}$ alkyl group, which comprises heating a 1-phthalimidoacyl-hydrazone derivative represented by the formula,

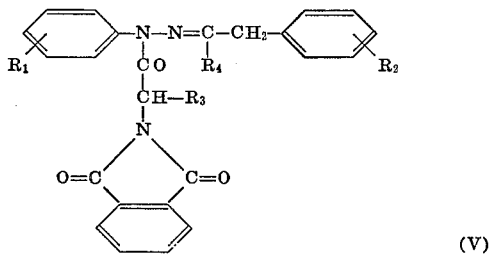

(V)

wherein $R_1$, $R_2$ and $R_3$ are as defined above, and $R_4$ represents a hydrogen atom or a $C_{1-4}$ alkyl group, at elevated temperatures to obtain a 1-phthalimidoacyl-indole derivative represented by the formula,

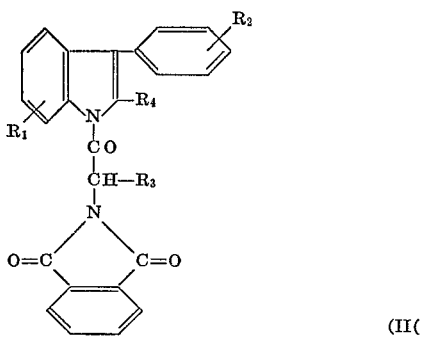

(II)

wherein $R_1$, $R_2$, $R_3$ and $R_4$ are as defined above, contacting the obtained 1 - phthalimidoacyl - indole derivative represented by the Formula II with ozone, and thereafter contacting the obtained reaction product with a hydrazine derivative.

6. A method according to claim 5, wherein the 1-phthalimidoacyl-hydrazone derivative represented by the Formula V is heated at a temperature between 50° and 250° C. in the presence of a catalytic or more amount of an acid in a solvent to obtain the 1-phthalimidoacyl-indole derivative representative by the Formula II.

7. A method for preparing benzodiazepine derivatives represented by the formula,

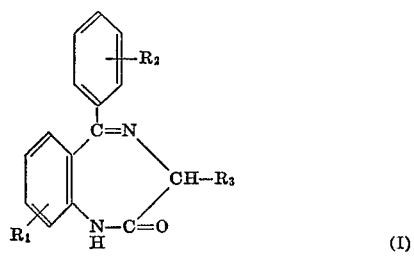

(I)

wherein $R_1$ represents a hydrogen atom, a halogen atom, a $C_{1-4}$ alkyl group, a nitro group or a trifluoromethyl group; $R_2$ represents a hydrogen atom or a halogen atom; and $R_3$ represents a hydrogen atom or a $C_{1-4}$ alkyl group, which comprises contacting a phenylhydrazone derivative represented by the formula,

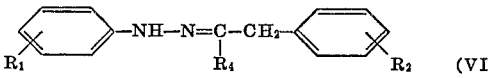

(VI)

wherein $R_1$ and $R_2$ are as defined above and $R_4$ is hydrogen atom or a $C_{1-4}$ alkyl group, with a phthalimidoacyl halide represented by the formula,

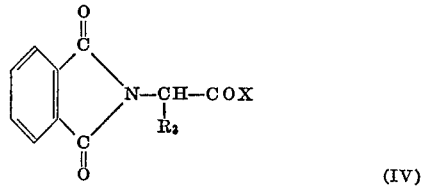

(IV)

wherein $R_3$ is as defined above and X represents a halogen atom, to obtain a 1-phthalimidoacyl-hydrazone derivative represented by the formula,

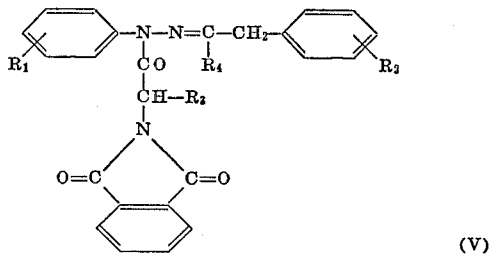

(V)

wherein $R_1$, $R_2$, $R_3$ and $R_4$ are as defined above, heating the obtained 1-phthalimidoacyl hydrazone derivative represented by the Formula V at an elevated temperature to obtain a 1 - phthalimidoacyl-indole derivative represented by the formula,

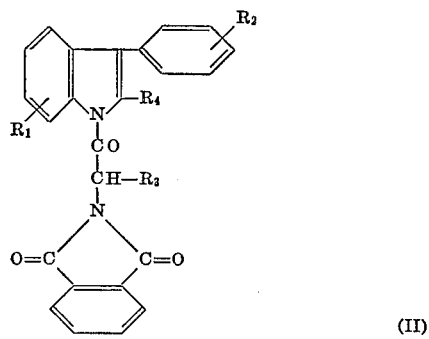

(II)

wherein $R_1$, $R_2$, $R_3$ and $R_4$ are as defined above, contacting the obtained 1-phthalimidoacyl-indole derivative represented by the Formula II with ozone, and thereafter with a hydrazine derivative.

8. A method according to claim 7, wherein the phenylhydrazone derivative represented by the Formula VII is contacted with the phthalimidoacyl halide represented by the Formula IV in the presence of at least equimolecular amount of the reactants of an acid-binding agent in a solvent.

9. A method for preparing benzodiazepine derivatives represented by the formula,

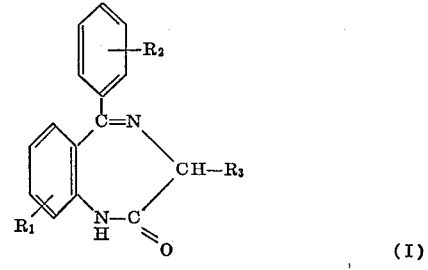

(I)

wherein $R_1$ represents a hydrogen atom, a halogen atom, a $C_{1-4}$ alkyl group, a nitro group or a trifluoromethyl group; $R_2$ represents a hydrogen atom or a halogen atom; and $R_3$ represents a hydrogen atom or a $C_{1-4}$ alkyl group, which comprises contacting an ozonide represented by the formula,

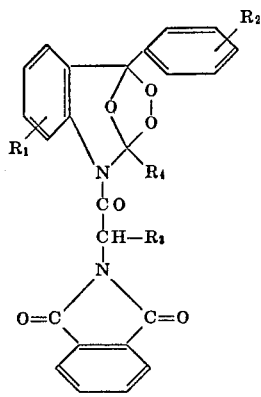

(VI)

wherein $R_1$, $R_2$ and $R_3$ are as defined above, and $R_4$ represents a hydrogen atom or a $C_{1-4}$ alkyl group, with a hydrazine derivative.

10. A method according to claim 9, wherein the hydrazine derivative is a hydrazine hydrate or a phenylhydrazine.

References Cited
FOREIGN PATENTS
6500446   1/1965   Netherlands ____ 260—239.3 D

OTHER REFERENCES
Fieser et al.: "Advanced Organic Chemistry" (Reinhold) (1961), pp. 193–195.

Mentzer et al.: Bull. Soc. Chim. France, pp. 555–561 (1950).

Mentzer et al.: Bull. Soc. Chim. France, pp. 782–786 (1950).

Elderfield: "Heterocyclic Compounds," vol. 3, pp. 1–13 (Wiley) (1952).

Ockenden et al.: J. Chem. Soc., 1953, pp. 612–618.

Ockenden et al.: J. Chem. Soc., 1953, pp. 3440–3443.

Witkop: Leibig's Ann. Der Chemie, vol. 556, pp. 103–114 (1944).

HENRY R. JILES, Primary Examiner

R. T. BOND, Assistant Examiner

U.S. Cl. X.R.

260—326, 326.15, 244, 999, 339, 240 G